(12) United States Patent
Harman

(10) Patent No.: US 8,559,813 B2
(45) Date of Patent: Oct. 15, 2013

(54) PASSBAND REFLECTOMETER

(75) Inventor: Dale D. Harman, Freehold, NJ (US)

(73) Assignee: Alcatel Lucent, Paris (FR)

( * ) Notice: Subject to any disclaimer, the term of this patent is extended or adjusted under 35 U.S.C. 154(b) by 258 days.

(21) Appl. No.: 13/076,652

(22) Filed: Mar. 31, 2011

(65) Prior Publication Data

US 2012/0251125 A1    Oct. 4, 2012

(51) Int. Cl.
*H04B 17/00* (2006.01)
*H04J 14/02* (2006.01)

(52) U.S. Cl.
CPC ..................... *H04J 14/02* (2013.01)
USPC .................... 398/9; 398/16; 398/22

(58) Field of Classification Search
USPC ............... 398/9, 10, 13, 16, 17, 20–22, 129
See application file for complete search history.

(56) References Cited

U.S. PATENT DOCUMENTS

| | | | |
|---|---|---|---|
| 4,821,326 A | 4/1989 | MacLeod | |
| 5,253,326 A | 10/1993 | Yong | |
| 5,352,984 A * | 10/1994 | Piesinger | ............. 324/532 |
| 5,675,554 A | 10/1997 | Cole et al. | |
| 5,678,221 A | 10/1997 | Cahill | |
| 5,729,694 A | 3/1998 | Holzrichter et al. | |
| 5,940,791 A | 8/1999 | Byrnes et al. | |
| 6,006,175 A | 12/1999 | Holzrichter | |
| 6,151,571 A | 11/2000 | Pertrushin | |
| 6,212,496 B1 | 4/2001 | Campbell et al. | |
| 6,223,157 B1 | 4/2001 | Fisher et al. | |
| 6,487,531 B1 | 11/2002 | Tosaya et al. | |
| 6,801,894 B2 | 10/2004 | Nakamura et al. | |
| 7,035,795 B2 | 4/2006 | Burnett et al. | |
| 7,082,395 B2 | 7/2006 | Tosaya et al. | |
| 7,088,766 B2 | 8/2006 | Aust et al. | |
| RE39,336 E | 10/2006 | Pearson | |
| 7,251,601 B2 | 7/2007 | Kagoshima et al. | |
| 7,324,582 B2 | 1/2008 | Carson | |
| 7,475,011 B2 | 1/2009 | Deng et al. | |
| 7,643,535 B1 | 1/2010 | Wiss et al. | |
| 7,872,737 B2 * | 1/2011 | Zhang et al. | ............. 356/73.1 |

(Continued)

OTHER PUBLICATIONS

Carrick Detweiler, et al., "Ultrasonic Speech Capture Board: Hardware Platform and Software Interface," May 14, 2008 [Retrieved on Feb. 4, 2010] [Retrieved from the internet <URL: http://people.csail.mit.edu/carrick/papers/DetweilerV2008.pdf.> pp. 1-25.

(Continued)

*Primary Examiner* — Dalzid Singh
(74) *Attorney, Agent, or Firm* — Mendelsohn, Drucker & Associates, P.C.; Yuri Gruzdkov; Steve Mendelsohn

(57) ABSTRACT

A time-domain (TD) reflectometer that is designed to operate based on probe and response signals that are substantially fully spectrally confined to a designated frequency passband. In one embodiment, the TD reflectometer uses a passband transmitter to generate the probe signal based on a pseudo-random bit sequence and a passband receiver to demodulate the response signal. The TD reflectometer determines the impulse response of a channel under test based on cross-correlation of the transmitter and receiver baseband signals. In various embodiments, the TD reflectometer can be designed to operate in an acoustic-frequency range, a radio-frequency range, or an optical-frequency range. Due to its passband configuration, the TD reflectometer is advantageously capable of determining impulse responses without disrupting the operation and/or interfering with normal functions of the tested channel.

21 Claims, 2 Drawing Sheets

(56) References Cited

U.S. PATENT DOCUMENTS

| | | |
|---|---|---|
| 2002/0116177 A1 | 8/2002 | Bu et al. |
| 2002/0120449 A1 | 8/2002 | Clapper |
| 2002/0186760 A1* | 12/2002 | Bostoen et al. ............... 375/224 |
| 2002/0194005 A1 | 12/2002 | Lahr |
| 2002/0194006 A1 | 12/2002 | Challapali |
| 2003/0097254 A1 | 5/2003 | Holzrichter et al. |
| 2003/0176934 A1 | 9/2003 | Gopalan et al. |
| 2004/0047295 A1* | 3/2004 | Morreale ....................... 370/241 |
| 2004/0220808 A1 | 11/2004 | Kobayashi et al. |
| 2005/0244020 A1 | 11/2005 | Nakajima et al. |
| 2005/0278167 A1 | 12/2005 | Burnett et al. |
| 2006/0200344 A1 | 9/2006 | Kosek et al. |
| 2007/0101313 A1 | 5/2007 | Bodin et al. |
| 2007/0112942 A1 | 5/2007 | Moquin et al. |
| 2007/0276658 A1 | 11/2007 | Douglass |
| 2008/0010071 A1 | 1/2008 | Callahan et al. |
| 2008/0154815 A1 | 6/2008 | Martinez |
| 2008/0162119 A1 | 7/2008 | Lenhardt |
| 2010/0131268 A1 | 5/2010 | Moeller |
| 2010/0217591 A1 | 8/2010 | Shpigel |
| 2011/0211827 A1* | 9/2011 | Soto et al. ....................... 398/25 |
| 2012/0136660 A1 | 5/2012 | Harman et al. |

OTHER PUBLICATIONS

PCT International Search Report PCT/US2009/064563, mailing date Feb. 22, 2010.

Kelly, John L, et al., "Speech Synthesis," Proc. Fourth Intern. Congr. Acoust., 1962, Paper G42, pp. 1-4.

Schroeder, M. R., "Integrated-impulse Method Measuring Sound Decay Without Using Impulses," The Journal of the Acoustical Society of America, vol. 66, No. 2, Aug. 1979, pp. 497-500.

Lee, Edward A., et al., "Digital Communication," (Second Edition) Kluwer Academic Press, 1994, pp. 190-207.

Sharp, D. B., "Acoustic Pulse Reectometry for the Measurement of Musical Wind Instruments," PhD Thesis, Dept. of Physics and Astronomy, University of Edinburgh, 1996 (30 pages).

* cited by examiner

200

300

PASSBAND REFLECTOMETER

CROSS-REFERENCE TO RELATED APPLICATIONS

The subject matter of this application is related to the subject matter of U.S. patent application Ser. No. 12/956,552, filed Nov. 30, 2010, and entitled "VOICE-ESTIMATION BASED ON REAL-TIME PROBING OF THE VOCAL TRACT," which is incorporated herein by reference in its entirety.

BACKGROUND

1. Field of the Invention

The present invention generally relates to time-domain reflectometry and, more specifically but not exclusively, to measuring an impulse response of an object, device, or system under test.

2. Description of the Related Art

This section introduces aspects that may help facilitate a better understanding of the invention(s). Accordingly, the statements of this section are to be read in this light and are not to be understood as admissions about what is in the prior art or what is not in the prior art.

A time-domain (TD) reflectometer is an instrument that is designed to characterize the impulse response of an object, device, or system under test. Depending on the type of the probe waves, a TD reflectometer can be classified as an acoustic reflectometer, a radio-frequency reflectometer, an optical reflectometer, etc. Exemplary applications that rely on TD reflectometers include but are not limited to fault diagnostics for coaxial cables and optical channels, integrity tests for printed circuit boards, waveguides, and wiring systems, detection of leaks in ducts and pipelines, and medical diagnostics of bodily cavities, such as the respiratory system and the ears, nose, and throat.

For example, a typical acoustic reflectometer operates by firing a short acoustic impulse into the object under test and recording the resulting echo. More specifically, the impulse undergoes partial reflection and partial transmission at each change in the cross-sectional area along the object's bore, thereby creating a reflection wave. This wave travels back to the reflectometer where it is picked up by a microphone. A suitable algorithm is then applied to the measured reflection wave, e.g., to reconstruct the object's bore profile and/or identify possible defects, such as holes or leaks. Other types of conventional TD reflectometers operate based on a similar principle.

SUMMARY

Disclosed herein are various embodiments of a time-domain (TD) reflectometer that is designed to operate based on probe and response signals that are substantially fully spectrally confined to a designated frequency passband. In one embodiment, the TD reflectometer uses a passband transmitter to generate the probe signal based on a maximum-length bit sequence and a passband receiver to demodulate the response signal. The TD reflectometer determines the impulse response of a channel under test based on cross-correlation of the transmitter and receiver baseband signals. In various embodiments, the TD reflectometer can be designed to operate in an acoustic-frequency range, a radio-frequency range, or an optical-frequency range. Due to its passband configuration, the TD reflectometer is advantageously capable of determining impulse responses without disrupting the operation and/or interfering with normal functions of the tested channel.

According to one embodiment, provided is an apparatus comprising (i) a passband transmitter configured to generate a drive signal based on a bit sequence; (ii) an interface configured to convert the drive signal into a probe signal, apply the probe signal to a channel under test, and receive a response signal corresponding to the probe signal back from said channel; and (iii) a passband receiver configured to receive, from the interface, an input signal corresponding to the response signal and to convert said input signal into a receiver-baseband signal. The probe signal is spectrally limited to a spectral band located at frequencies higher than a first specified nonzero threshold frequency. The apparatus is configured to characterize an impulse response of the channel under test based on the bit sequence and the receiver-baseband signal.

According to another embodiment, provided is a method of characterizing an impulse response, the method comprising the steps of: (i) generating a drive signal based on a bit sequence using a passband transmitter; (ii) converting the drive signal into a probe signal, wherein the probe signal is spectrally limited to a spectral band located at frequencies higher than a first specified nonzero threshold frequency; (iii) applying the probe signal to a channel under test; (iv) receiving a response signal corresponding to the probe signal back from said channel; (v) generating a receiver-baseband signal based on the response signal using a passband receiver; and (vi) characterizing the impulse response based on the bit sequence and the receiver-baseband signal.

BRIEF DESCRIPTION OF THE DRAWINGS

Other aspects, features, and benefits of various embodiments of the invention will become more fully apparent, by way of example, from the following detailed description and the accompanying drawings, in which.

DETAILED DESCRIPTION

One problem with a typical prior-art time-domain (TD) reflectometer is that it relies on a relatively short probe impulse for the excitation of a response signal. Since a short impulse has a correspondingly broad frequency spectrum, some portions of this spectrum might overlap with spectral regions populated by other signals. Disadvantageously, this overlap may cause an unacceptable level of signal interference, which may disrupt the operation and/or interfere with normal functions of the article that is being probed with the TD reflectometer.

Figure 1:
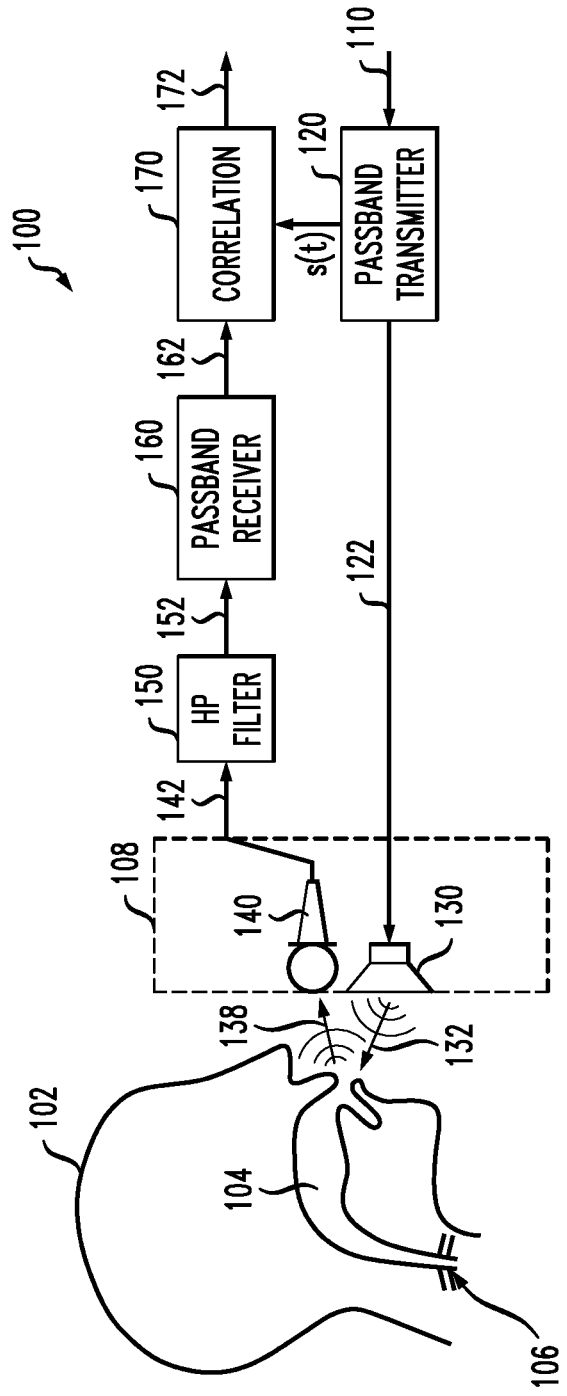
FIG. 1 shows a block diagram of a time-domain reflectometer according to one embodiment of the invention.

FIG. 1 shows a block diagram of an acoustic reflectometer 100 according to one embodiment of the invention. Reflectometer 100 is illustratively shown as being configured to measure an impulse response of the vocal tract 104 of a person 102. As used herein, the term "impulse response" refers to an echo signal produced by the object, device, or system under test in response to a single, very short excitation impulse. Mathematically, an ideal excitation impulse that produces an ideal impulse response is described by the Dirac delta function for continuous-time systems or by the Kronecker delta for discrete-time systems. Since the excitation waveforms that are generated in practice are not ideal, the impulse response measured by a reflectometer, such as reflectometer 100, is an approximation of the ideal impulse response. The term "impulse response" should be construed to encompass both the reflected impulse response and the transmitted impulse response. In the context of TD reflectometers, the measured impulse response is usually a reflected impulse response. However, known algorithms can be used to convert the measured reflected impulse response into a corresponding transmitted impulse response, with the latter being the impulse response that would have been measured at the remote end of the channel under test, such as the glottis 106 in vocal tract 104.

Since the shape of vocal tract 104 may change over time, e.g., when person 102 speaks, the impulse responses measured by reflectometer 100 at different times may differ from one another. An output signal 172 generated by reflectometer 100 provides the measured impulse responses for further processing to external circuitry, such as a digital signal processor (not explicitly shown). Reflectometer 100 can be used, e.g., in a voice-estimation apparatus disclosed in the above-cited U.S. patent application Ser. No. 12/956,552 to detect silent speech or to enhance normal speech when it is superimposed onto or overwhelmed by a relatively noisy acoustic background. Other uses of reflectometer 100, such as determination of cross-sectional profiles of tubular objects, are also contemplated.

Reflectometer 100 differs from a comparable prior-art reflectometer in that it is designed to operate based on probe and response signals that are substantially fully spectrally confined to a designated frequency band located at frequencies higher than a specified first threshold frequency. In a representative embodiment, the first threshold frequency is selected so that these probe and response signals do not interfere with human speech and/or hearing. Likewise, human speech and other audible acoustic signals do not disturb the operation of reflectometer 100. In general, the frequency band has a spectral width defined as the difference between the band's first or lower threshold frequency and the band's second or upper threshold frequency. One skilled in the art will appreciate that the spectral width is related to the type and rate of signal modulation employed in reflectometer 100.

In one embodiment, the spectrum of an acoustic probe signal 132 emitted by a speaker 130 into vocal tract 104 is confined to a spectral band located at frequencies higher than about 20 kHz, which makes signal 132 imperceptible by humans. In this case, speaker 130 acts as an ultrasonic transducer. An electrical output signal 142 generated by a microphone 140 is subjected to high-pass filtering in a high-pass (HP) filter 150, thereby producing a filtered signal 152. HP filter 150 has a cutoff frequency of about 20 kHz, which removes signal components corresponding to external audible sound (if any) picked up by microphone 140. Since neither of signals 132 and 152 has frequencies below about 20 kHz, the operation of reflectometer 100 does not disturb the perception of human speech and is not disturbed by any external audible sounds. In one embodiment, HP filter 150 can be replaced by an appropriate bandpass filter.

Note that speaker 130 and microphone 140 are parts of an interface 108 that appropriately couples reflectometer 100 to vocal tract 104 or other channel under test. In various alternative embodiments, interface 108 can be specifically designed to provide optimal signal coupling between the reflectometer and the channel under test. In various applications, the channel under test can be, without limitation, an object, a living organism, a device, or a system/subsystem.

Speaker 130 generates probe signal 132 while being driven by a drive signal 122 that is generated by a passband transmitter 120. An exemplary embodiment of passband transmitter 120 is described in more detail below in reference to FIG. 2. Probe signal 132 enters vocal tract 104 through the mouth of person 102 and undergoes multiple reflections within the various cavities of the vocal tract. Reflected waves (response signals) 138 exit vocal tract 104 through the mouth of person 102 and are detected by microphone 140, which generates output signal 142. HP filter 150 produces filtered signal 152 by removing spurious low-frequency components from signal 142. Signal 152 is demodulated in a passband receiver 160 to produce a demodulated signal 162. An exemplary embodiment of passband receiver 160 is described in more detail below in reference to FIG. 3.

Passband transmitter 120 generates drive signal 122 based on a data signal 110. In one embodiment, data signal 110 carries a pseudo-random bit sequence, such as a maximum-length sequence (MLS). More specifically, an MLS sequence consists of an apparently random (but deterministic) sequence of zeros and ones arranged in such a manner that the resulting signal has a substantially flat frequency spectrum in the frequency range between the zero (dc) frequency and the Nyquist frequency. An MLS sequence has $N=2^m-1$ bits and can be generated as known in the art, e.g., using a recursion relation corresponding to a primitive polynomial. The value of m affects the acquisition speed of reflectometer 100, meaning that the reflectometer can measure no more than one impulse response in a time period corresponding to the full MLS length. In a representative configuration, m=7. Other values of m can also be used. In general, the larger the m value, the higher the temporal resolution of the measured impulse response. Therefore, the m value is preferably selected to strike an acceptable compromise between the acquisition speed and the desired temporal resolution of the measured impulse responses.

To use an MLS sequence in a measurement, it is convenient to convert data signal 110 into a corresponding signal s(t) that oscillates around zero rather than around ½. This conversion is performed in passband transmitter 120, e.g., as further explained below in reference to FIG. 2. In one implementation, signal s(t) is generated so that (i) each "zero" of the corresponding MLS sequence is represented by a high signal level and (ii) each "one" of the MLS sequence is represented by a low signal level, with the latter level having the same magnitude as the high signal level but the opposite sign. The circular auto-correlation function ρ of signal s(t) is two-valued, as expressed by Eqs. (1a)-(1b):

$$\rho_0 = 1 \tag{1a}$$

$$\rho_i = -\frac{1}{N} \text{ for any } i \neq 0 \ (\text{mod } N) \tag{1b}$$

where $\rho_i$ is defined by Eq. (2):

$$\rho_i = \frac{1}{N} \sum_{j=0}^{N-1} s_j \bar{s}_{j+i} \tag{2}$$

where $s_j$ is the value of signal s(t) in the j-th time slot; j+i is taken modulo N; and the horizontal bar over the symbol denotes complex conjugation. For real-valued signals, the complex-conjugation operation can be omitted.

Demodulated signal 162 reports on the impulse response of vocal tract 104 as expressed by Eq. (3):

$$y=s(t)*h \qquad (3)$$

where y denotes signal 162; h denotes the impulse response of vocal tract 104; and the asterisk sign denotes convolution. The cross-correlation function ($\phi$) for demodulated signal 162 and signal s(t) is given by Eq. (4):

$$\phi_i = \frac{1}{N}\sum_{j=0}^{N-1} s_j \bar{y}_{j+i} = \frac{1}{N}\sum_{j=0}^{N-1} s_{j-i}\bar{y}_j \qquad (4)$$

where $\phi_i$ is the value of $\phi$ in the i-th time slot, $y_j$ is the value of demodulated signal 162 in the j-th time slot, and the rest of the notations are the same as in Eq. (2). By performing cross-correlation with signal s(t) on both sides of Eq. (3) and taking into account Eqs. (2) and (4), one arrives at Eq. (5):

$$\phi = \rho * h \qquad (5)$$

Note that convolution in the time domain is equivalent to multiplication in the frequency domain. Thus, Eq. (5) tells us that, due to the fact that the frequency spectrum of auto-correlation function $\rho$ is flat except for its zero component, cross-correlation function $\phi$ can be used to extract impulse response h from demodulated signal 162 in a relatively straightforward manner. For example, in one embodiment, this extraction can be performed using the following signal-processing steps: (i) Fourier transforming signal s(t); (ii) Fourier transforming demodulated signal 162; (iii) multiplying these two Fourier transforms; and (iv) applying an inverse Fourier transformation to the product generated at step (iii). When reflectometer 100 repeatedly uses the same MLS sequence, step (i) can be performed offline or only once, and the resulting Fourier transform can be stored in a memory and then retrieved as needed for use in all subsequent occurrences of step (iii).

In one embodiment, reflectometer 100 has a correlation module 170 configured to (i) determine the impulse response of vocal tract 104 by performing the above-indicated signal-processing steps and (ii) output the result via output signal 172. Alternatively or in addition, correlation module 170 can be configured to apply other suitable processing methods. Representative processing methods that can be used in correlation module 170 are described, e.g., in U.S. Pat. Nos. 7,643,535, 7,324,582, and 7,088,766, all of which are incorporated herein by reference in their entirety. Additional useful techniques that can be implemented in correlation module 170 are disclosed, e.g., in the paper by M. R. Schroeder, entitled "Integrated-Impulse Method Measuring Sound Decay without Using Impulses," published in J. Acoust. Soc. Am, 1979, v. 66(2), pp. 497-500, which paper is incorporated herein by reference in its entirety.

Figure 2:
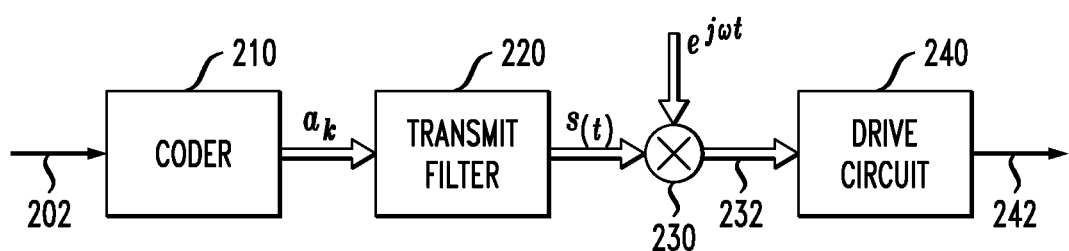
FIG. 2 shows a block diagram of a passband transmitter that can be used in the reflectometer of FIG. 1 according to one embodiment of the invention.

FIG. 2 shows a block diagram of a passband transmitter 200 that can be used as passband transmitter 120 according to one embodiment of the invention. Transmitter 200 generates a drive signal 242 based on a data signal 202. In one embodiment, signals 202 and 242 can be signals 110 and 122, respectively (see FIG. 1). Transmitter 200 also generates signal s(t), a copy of which can be provided to correlation module 170 as indicated in FIG. 1.

Transmitter 200 has a coder module 210 that transforms the bit sequence carried by data signal 202 into a corresponding sequence of constellation symbols $a_k$. Depending on the invoked constellation, symbols $a_k$ can be complex-valued or real-valued. Representative constellations that can be employed in coder module 210 include but are not limited to the constellations that are customarily used in binary phase-shift keying (BPSK), quadrature phase-shift keying (QPSK), amplitude-shift keying (ASK), and quadrature amplitude modulation (QAM).

A transmit filter 220 converts symbol sequence $a_k$ into signal s(t) according to Eq. (6):

$$s(t) = \sum_k a_k g(t - kT) \qquad (6)$$

where g(t) is the pulse-shape envelope, and T is the symbol period. In general, function g(t) can be real-valued or complex-valued. To reduce the effects of inter-symbol interference, function g(t) is usually selected so that it is mostly contained within a single symbol period, i.e., is substantially zero at times t<0 and at times t>T. In the context of passband transmitters, signal s(t) is sometimes referred to as the transmitter-baseband signal.

A multiplier (frequency up-converter) 230 injects a carrier-frequency signal $e^{j\omega t}$ into signal s(t) to generate a passband signal 232. In various embodiments, carrier frequency $\omega$ can be selected from an acoustic-frequency range or a radio-frequency range. In general, carrier frequency $\omega$ should be sufficiently high so that passband signal 232 does not have any negative frequency components.

A drive circuit 240 converts passband signal 232 into drive signal 242, e.g., by performing digital-to-analog conversion and optionally amplifying and/or biasing the resulting analog signal to achieve proper compatibility with the corresponding interface component of the reflectometer, e.g., speaker 130 in reflectometer 100 (FIG. 1).

In an alternative embodiment, frequency up-converter 230 can be removed from transmitter 200 and, instead, be placed at the corresponding interface, such as interface 108 (FIG. 1). A representative frequency up-converter that is suitable for use with this alternative embodiment is an optical modulator coupled to a laser. The laser serves as an optical carrier-frequency source, and the optical modulator provides the means for imprinting drive signal 242 provided by drive circuit 240 onto the optical carrier. This alternative embodiment is suitable for use, e.g., in an optical reflectometer.

Figure 3:
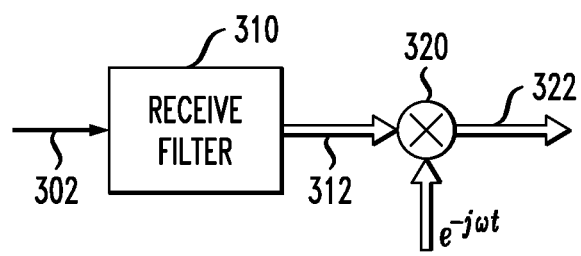
FIG. 3 shows a block diagram of a passband receiver that can be used in the reflectometer of FIG. 1 according to one embodiment of the invention.

FIG. 3 shows a block diagram of a passband receiver 300 that can be used as passband receiver 160 according to one embodiment of the invention. Receiver 300 receives an input signal 302 and, based on the input signal, generates a receiver-baseband signal 322. In one embodiment, signals 302 and 322 can be signals 152 and 162, respectively (see FIG. 1).

Input signal 302 is applied to a receive filter 310, where it is corrected for the effects of the intervening elements located between the channel under test (e.g., vocal tract 104) and the corresponding transmitter (e.g., transmitter 120) and receiver 300. For example, if receiver 300 is used in reflectometer 100, then these intervening elements include speaker 130, microphone 140, and HP filter 150 (see FIG. 1). The corrected signal is labeled 312 in FIG. 3. In one embodiment, receive filter 310 implements the correction processing in the digital domain and, as such, has an analog-to-digital converter (not explicitly shown) at its front end. Alternatively, receive filter 310 can be designed to implement the correction processing in the analog domain, in which case the receive filter has an analog-to-digital converter (not explicitly shown) at its back end. One skilled in the art will appreciate that the correction processing implemented in receive filter 310 can advantageously improve the accuracy of the measured impulse responses.

A demodulator 320 down-converts signal 312 from the passband to the baseband to produce receiver-baseband signal 322.

While this invention has been described with reference to illustrative embodiments, this description is not intended to be construed in a limiting sense.

Although certain embodiments of the invention have been described in reference to acoustic reflectometer 100 (FIG. 1), the invention is not so limited. From the provided description, one of ordinary skill in the art will be able to make and use similarly functioning radio-frequency reflectometers and optical reflectometers. More specifically, most of the changes to the reflectometer structure shown in FIG. 1 deal with interface 108 and the functional blocks that set the carrier frequency. For example, a radio-frequency reflectometer can be constructed by replacing speaker 130 and microphone 140 in interface 108 by an RF antenna or an RF-signal coupler, and utilizing an RF carrier frequency in transmitter 120 (FIG. 1). An antenna can be used for both transmitting probe signal 132 to a wireless channel under test and receiving response signal 138 from said channel. An RF-signal coupler can similarly be used for both transmitting probe signal 132 to a wire-based channel (e.g., a cable) under test and receiving response signal 138 from said channel.

An optical reflectometer can be constructed, e.g., by (i) removing multiplier 230 from circuit 200 (FIG. 2), (ii) replacing speaker 130 in interface 108 (FIG. 1) by an optical modulator, such as a Mach-Zehnder modulator, coupled to a laser source, (iii) replacing microphone 140 in interface 108 (FIG. 1) by an optical coupler, and (iv) replacing HP filter 150 and receiver 160 (FIG. 1) by a conventional homodyne or intradyne coherent optical receiver. In this embodiment, the laser source is used to provide a local-oscillator signal for the coherent receiver, as well as the optical carrier frequency for signals 132 and 138. The optical modulator is driven by signal 122 in a conventional manner to generate signal 132, thereby serving as a frequency up-converter.

As used herein, the term "acoustic frequency" refers to a frequency from (i) the human audio-frequency range, e.g., between about 15 Hz and about 20 kHz, or (ii) an ultrasonic frequency range, e.g., between about 20 kHz and about 20 MHz.

As used herein, the term "radio frequency" or "RF" refers to a rate of oscillation in the range between about 3 kHz and 300 GHz.

As used herein, the term "optical frequency" refers to a rate of oscillation in the range between about 100 THz and 800 THz.

Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The present inventions may be embodied in other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks that perform digital signal processing may be provided through the use of dedicated hardware as well as hardware capable of executing software in association with appropriate software. The functions of these functional blocks may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, application specific integrated circuit (ASIC), field programmable gate array (FPGA), read only memory (ROM) for storing software, random access memory (RAM), and non volatile storage. Other hardware, conventional and/or custom, may also be included.

What is claimed is:

1. An apparatus comprising:
a passband transmitter configured to generate a drive signal based on a bit sequence;

an interface configured to convert the drive signal into a probe signal, apply the probe signal to a channel under test, and receive a response signal corresponding to the probe signal back from said channel;

a passband receiver configured to receive, from the interface, an input signal corresponding to the response signal and to convert said input signal into a receiver-baseband signal; and a high-pass filter coupled between the interface and the passband receiver, wherein:

the probe signal is spectrally limited to a spectral band located at frequencies higher than a first threshold frequency, wherein the first threshold frequency is a nonzero frequency;

the apparatus is configured to characterize an impulse response of the channel under test based on the bit sequence and the receiver-baseband signal; and the high-pass filter has a cut-off frequency that is lower than or about the same as the first threshold frequency.

2. The apparatus of claim 1, wherein the bit sequence is a maximum-length sequence.

3. The apparatus of claim 1, wherein the passband transmitter comprises:

a coder module configured to convert the bit sequence into a corresponding sequence of constellation symbols; and a transmit filter configured to convert the sequence of constellation symbols into a transmitter-baseband signal, wherein:

the passband transmitter is configured to generate the drive signal based on the transmitter-baseband signal; and the apparatus is configured to determine the impulse response based on a correlation between the receiver-baseband signal and the transmitter-baseband signal.

4. The apparatus of claim 3, wherein the coder module is configured to convert the bit sequence into the sequence of constellation symbols using a constellation selected from a set consisting of a binary phase-shift keying (BPSK) constellation, a quadrature phase-shift keying (QPSK) constellation, an amplitude-shift keying (ASK) constellation, and a quadrature amplitude modulation (QAM) constellation.

5. The apparatus of claim 3, wherein the passband transmitter further comprises:

a frequency up-converter configured to inject a carrier frequency into the transmitter-baseband signal to generate a transmitter-passband signal; and a drive circuit configured to generate the drive signal based on the transmitter-passband signal.

6. The apparatus of claim 5, wherein:

the interface comprises an ultrasonic transducer configured to convert the drive signal into the probe signal; and the carrier frequency is selected from an ultrasonic frequency range.

7. The apparatus of claim 5, wherein:

the interface comprises an antenna or a radio-frequency coupler configured to convert the drive signal into the probe signal; and the carrier frequency is selected from a radio-frequency range.

8. The apparatus of claim 3, wherein:

the interface comprises an optical modulator coupled to a laser and configured to generate the probe signal based on the drive signal and a carrier-frequency signal provided by the laser; and the carrier frequency is in an optical-frequency range.

9. The apparatus of claim 3, further comprising a correlation module configured to:

generate a Fourier transform of the receiver-baseband signal;

generate a correlation function by multiplying the Fourier transform of the receiver-baseband signal and a Fourier transform of the transmitter-baseband signal;

generate an inverse Fourier transform of the correlation function; and determine the impulse response based on the inverse Fourier transform.

10. The apparatus of claim 1, wherein the passband receiver comprises:

a receive filter configured to correct the input signal for filtering effects of the interface; and a demodulator configured to down-convert the corrected input signal to generate the receiver-baseband signal.

11. The apparatus of claim 1, wherein:

the interface is designed to be coupled to a human vocal tract; and the apparatus is an acoustic reflectometer.

12. The apparatus of claim 1, wherein the impulse response is a reflected impulse response.

13. A method of characterizing an impulse response, the method comprising:

generating a drive signal based on a bit sequence using a passband transmitter;

converting the drive signal into a probe signal using an interface, wherein the probe signal is spectrally limited to a spectral band located at frequencies higher than a first threshold frequency, wherein the first threshold frequency is a nonzero frequency;

applying the probe signal to a channel under test using the interface;

receiving a response signal corresponding to the probe signal back from said channel, wherein the interface is configured to receive said response signal;

generating a receiver-baseband signal based on the response signal using a passband receiver; and characterizing an impulse response of the channel based on the bit sequence and the receiver-baseband signal; and wherein the step of generating the drive signal using the passband transmitter comprises:

converting the bit sequence into a corresponding sequence of constellation symbols; and converting the sequence of constellation symbols into a transmitter-baseband signal, wherein:

the drive signal is generated based on the transmitter-baseband signal; and the impulse response is determined based on a correlation between the receiver-baseband signal and the transmitter-baseband signal.

14. The method of claim 13, wherein the bit sequence is a maximum-length sequence.

15. The method of claim 13, wherein the bit sequence is converted into the sequence of constellation symbols using a constellation selected from a set consisting of a binary phase-shift keying (BPSK) constellation, a quadrature phase-shift keying (QPSK) constellation, an amplitude-shift keying (ASK) constellation, and a quadrature amplitude modulation (QAM) constellation.

16. The method of claim 13, wherein the step of generating the drive signal further comprises:

frequency up-converting the transmitter-baseband signal by injecting a carrier frequency into the transmitter-baseband signal to generate a transmitter-passband signal; and generating the drive signal based on the transmitter-passband signal.

17. The method of claim 13, further comprising generating a carrier-frequency signal using a laser, wherein:
- the probe signal is generated using an optical modulator configured to modulate the carrier-frequency signal based on the drive signal; and
- the carrier frequency is in an optical-frequency range.

18. The method of claim 13, further comprising:
- generating a Fourier transform of the receiver-baseband signal;
- generating a correlation function by multiplying the Fourier transform of the receiver-baseband signal and a Fourier transform of the transmitter-baseband signal;
- generating an inverse Fourier transform of the correlation function; and
- determining the impulse response based on the inverse Fourier transform.

19. An apparatus comprising:
- a passband transmitter configured to generate a drive signal based on a bit sequence;
- an interface configured to convert the drive signal into a probe signal, apply the probe signal to a channel under test, and receive a response signal corresponding to the probe signal back from said channel; and
- a passband receiver configured to receive, from the interface, an input signal corresponding to the response signal and to convert said input signal into a receiver-baseband signal, wherein:
  - the probe signal is spectrally limited to a spectral band located at frequencies higher than a first threshold frequency, wherein the first threshold frequency is a nonzero frequency;
  - the apparatus is configured to characterize an impulse response of the channel under test based on the bit sequence and the receiver-baseband signal; and
  - the passband transmitter comprises:
    - a coder module configured to convert the bit sequence into a corresponding sequence of constellation symbols; and
    - a transmit filter configured to convert the sequence of constellation symbols into a transmitter-baseband signal;
  - the passband transmitter is configured to generate the drive signal based on the transmitter-baseband signal; and
  - the apparatus is configured to determine the impulse response based on a correlation between the receiver-baseband signal and the transmitter-baseband signal.

20. An apparatus comprising:
- a passband transmitter configured to generate a drive signal based on a bit sequence;
- an interface configured to convert the drive signal into a probe signal, apply the probe signal to a channel under test, and receive a response signal corresponding to the probe signal back from said channel; and
- a passband receiver configured to receive, from the interface, an input signal corresponding to the response signal and to convert said input signal into a receiver-baseband signal, wherein:
  - the probe signal is spectrally limited to a spectral band located at frequencies higher than a first threshold frequency, wherein the first threshold frequency is a nonzero frequency;
  - the apparatus is configured to characterize an impulse response of the channel under test based on the bit sequence and the receiver-baseband signal; and
  - the passband receiver comprises:
    - a receive filter configured to correct the input signal for filtering effects of the interface; and
    - a demodulator configured to down-convert the corrected input signal to generate the receiver-baseband signal.

21. An apparatus comprising:
- a passband transmitter configured to generate a drive signal based on a bit sequence;
- an interface configured to convert the drive signal into a probe signal, apply the probe signal to a channel under test, and receive a response signal corresponding to the probe signal back from said channel; and
- a passband receiver configured to receive, from the interface, an input signal corresponding to the response signal and to convert said input signal into a receiver-baseband signal, wherein:
  - the probe signal is spectrally limited to a spectral band located at frequencies higher than a first threshold frequency, wherein the first threshold frequency is a nonzero frequency;
  - the apparatus is configured to characterize an impulse response of the channel under test based on the bit sequence and the receiver-baseband signal;
  - the interface is designed to be coupled to a human vocal tract; and
  - the apparatus is an acoustic reflectometer.

* * * * *